US006968913B1

(12) United States Patent  (10) Patent No.: US 6,968,913 B1
Priepke  (45) Date of Patent: Nov. 29, 2005

(54) SKID STEER VEHICLE INCLUDING STEERING ACTUATORS TO SIMULTANEOUSLY STEER ONE SIDE'S WHEELS

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/869,274

(22) Filed: Jun. 16, 2004

(51) Int. Cl.⁷ ............................................. B62D 11/04
(52) U.S. Cl. ..................................... 180/6.24; 180/6.48
(58) Field of Search ............................. 180/6.24, 408, 180/411, 412, 6.32, 6.38; 280/93.502, 93.51, 280/93.513

(56) References Cited

U.S. PATENT DOCUMENTS

| 163,681 | A | 5/1875 | Milliken |
|---|---|---|---|
| 756,992 | A | 4/1904 | Twitchell |
| 1,172,866 | A | 2/1916 | Blevins |
| 1,891,578 | A | 12/1932 | Reed |
| 2,105,781 | A | 1/1938 | Dixon |
| 2,354,830 | A | 8/1944 | Reid |
| 3,198,541 | A | 8/1965 | Christenson et al. |
| 3,620,321 | A * | 11/1971 | Thibodeau .................... 180/16 |
| 4,353,284 | A | 10/1982 | Billottet et al. |
| 4,705,449 | A * | 11/1987 | Christianson et al. ........ 414/685 |
| 4,782,906 | A * | 11/1988 | Kole ............................ 180/23 |
| 5,090,512 | A | 2/1992 | Mullet et al. |
| 5,288,091 | A * | 2/1994 | Deschamps .................. 180/409 |
| 5,531,466 | A * | 7/1996 | Hayashi ...................... 280/91.1 |
| 5,727,644 | A | 3/1998 | Roberts et al. |
| 6,354,394 | B1 | 3/2002 | Bauer-Nilsen |
| 6,488,114 | B1 * | 12/2002 | McMahon et al. ........... 180/414 |
| 6,491,131 | B1 | 12/2002 | Appleyard |
| 6,761,234 | B1 * | 7/2004 | Lamela et al. ................ 180/6.3 |
| 2002/0153188 | A1 | 10/2002 | Brandt et al. |

* cited by examiner

Primary Examiner—Tony Winner
(74) Attorney, Agent, or Firm—John William Stader; Stephen A. Bucchianeri (57) ABSTRACT

A skid steer vehicle includes a left side steering actuator that is coupled to left front and left rear drive wheels to steer the wheels with respect to the chassis, a right side steering actuator that is coupled to right front and right rear drive wheels to steer them with respect to the chassis. The actuators are fixed to the chassis and include steering arms or linkages that extend fore-and-aft to front and rear wheels and swivel housings that they pivot.

35 Claims, 5 Drawing Sheets

SKID STEER VEHICLE INCLUDING STEERING ACTUATORS TO SIMULTANEOUSLY STEER ONE SIDE'S WHEELS

FIELD OF THE INVENTION

The present invention generally relates to skid steer vehicles. More particularly, it relates to steering systems for steerable skid steer vehicles.

BACKGROUND OF THE INVENTION

Skid steer vehicles such as skid steer loaders are a mainstay of construction work. In their most common configuration, they have two drive wheels on each side of a chassis that are driven in rotation by one or more hydraulic motors coupled to the wheels on one side and another one or more hydraulic motors coupled to the wheels on the other side.

The wheels on one side of the vehicle can be driven independently of the wheels on the other side of the vehicle. This permits the wheels on opposing sides of the vehicle to be rotated at different speeds, in opposite directions, or both. By rotating in opposite directions, the skid steer can rotate in place about a vertical axis that extends through the vehicle itself.

The vehicles have an overall size of about 10 by 12 feet which, when combined with their ability to rotate in place, gives them considerable mobility at a worksite. It is this mobility that makes them a preferred vehicle.

Skid steer vehicles commonly have at least one loader lift arm that is pivotally coupled to the chassis of the vehicle to raise and lower at the operator's command. This arm typically has a bucket, blade or other implement attached to the end of the arm that is lifted and lowered thereby. Perhaps most commonly, a bucket is attached to the arm and the skid steer vehicle. This bucket is commonly used to carry supplies or particulate matter such as gravel, sand, or dirt around a worksite.

Skid steering provides its own problems. First, skidding tears the terrain over which the vehicle travels. The tighter the vehicle skid steers, the more damage to the ground it causes. A skid steer vehicle that turns in place can actually dig ruts into loose soil. Skid steer vehicles operated in close quarters rapidly denude soil by literally scrubbing the ground clean of grass and other plant matter.

The problems with skid steering have limited the use of skid steer vehicles to construction sites, road construction sites and other locations where there is no topsoil or plant matter to damage.

To answer the need for less ground-damaging vehicles, skid steer vehicles have been devised that provide limited steering of the drive wheels with respect to the chassis.

These skid steer vehicles have four wheels pivotable with respect to the chassis by four hydraulic cylinders. The cylinders are hydraulically coupled such that a single hydraulic valve is capable of simultaneously steering all four suspensions at once. When hydraulic fluid flows in a first direction, the front wheels are steered to the left and the rear wheels are steered to the right. When hydraulic fluid flows in the opposite direction, the front wheels are steered to the right and the rear wheels are steered to the left.

There are some limitations to this arrangement, however.

First, four hydraulic actuators are required, one for each wheel. Each wheel has its own separate actuator. It is a limitation to require four separate devices to turn the vehicle. The force levels required to turn the vehicle do not inherently require four actuators, however, and it would be beneficial to reduce their number.

Second, they do not permit the wheels to be steered independently of each other. They route fluid flow to all four steering cylinders through a single hydraulic valve. This valve simultaneously sends hydraulic fluid into all four steering actuators and in the same amounts. As a result, all the wheels turn together and turn the same amount. This arrangement does not permit the wheels to be steered independently or even semi-independently. As a result, the turning radii of the four wheels will not intersect at a common point. Whenever the turning radii of the wheels do not intersect at a common point, there will be tire scrubbing during the turn.

They only provide turning in place by skid steering. Their wheels cannot be oriented to reduce or eliminate wheel skidding when the vehicle is turned or rotated in place. The ability to turn in place is one of the most valued characteristics of the skid steer vehicle, hence the ability to reduce wheel skidding and tearing the ground while turning in place is of significant value.

What is needed, therefore, is an improved system of steering the wheels of a skid steer vehicle. What is also needed is a skid steer vehicle having an improved system of steering. What is also needed is a system for steering a skid steer vehicle that reduces the degree to which the wheels skid when the vehicle is turned. What is also needed is a system that permits the vehicle to be turned in place with reduced skidding. It is an object of this invention to provide one or more of these advantages.

SUMMARY OF THE INVENTION

In accordance with a first aspect of the invention, a skid steer vehicle is provided, including a chassis having a left side and a right side; left front and left rear drive wheels coupled to the left side of the chassis in fore-and-aft relation and driven by at least a first hydraulic motor; a left side steering actuator coupled to the left front and rear wheels to simultaneously steer the left front wheel to the right and the left rear wheel to the left, and to simultaneously steer the left front wheel to the left and the left rear wheel to the right; right front and right rear drive wheels coupled to the right side of the chassis in fore-and-aft relation and driven by at least a second hydraulic motor different from the first hydraulic motor; and a right side steering actuator coupled to the right front and rear wheels to simultaneously steer the right front wheel to the right and the right rear wheel to the left, and to simultaneously steer the right front wheel to the left and the right rear wheel to the right.

The at least a first motor may be coupled to the left front and left rear drive wheels to drive both left wheels forward at a common ground speed and backward at a common ground speed; and the at least a second motor may be coupled to the right front and right rear drive wheels to drive both right wheels forward at a common ground speed and backward at a common ground speed. The left steering actuator may be configured to steer the left front wheel to the right, and the right side steering actuator may be configured to simultaneously drive the right front wheel to the left. The four wheels may be the same size, and the four wheels may be simultaneously driven clockwise while the left front wheel is turned right and the right front wheel is turned left. The left side wheels may be driven anti-clockwise and the right side wheels simultaneously driven clockwise while the left front and right front wheels are steered in the same direction. The left side steering actuator may be fixed to the left side of the chassis between the left front and left rear wheels, and the right side steering actuator may be fixed to the right side of the chassis between the right front and right rear wheels. The steering actuators may include a housing enclosing a worm gear drive, and a motor coupled to the worm gear drive.

In accordance with a second aspect of the invention, a skid steer vehicle is provided, including a chassis having a left side and a right side; left front and left rear drive wheels coupled to the left side of the chassis; a left side steering actuator disposed to simultaneously steer the left front wheel to the right and the left rear wheel to the left, and to simultaneously drive the left front wheel to the left and the left rear wheel to the right; right front and right rear drive wheels coupled to the right side of the chassis; and a right side steering actuator disposed to simultaneously steer the right front wheel to the right and the right rear wheel to the left, and to simultaneously drive the right front wheel to the left and the right rear wheel to the right.

The left side actuator may be configured to steer the front left wheel to the right and the right side steering actuator may be configured to steer the right side front wheel simultaneously to the left. The skid steer vehicle may further include left side and right side forward extension links coupling the left and right front wheels to the left and right steering actuators, respectively; and left side and right side rear extension links coupling the left and right rear wheels to the left and right steering actuators, respectively. The left side wheels may be mechanically constrained to always turn in opposite directions, and the right side wheels may be mechanically constrained to turn in opposite directions. Both the left and right front wheels may turn in a first direction whenever both the left and right rear wheels turn in a second opposing direction. The left and right front wheels may turn in opposite directions whenever the left and right rear wheels are turned in opposite directions.

In accordance with a third aspect of the invention, a skid steer vehicle is provided, including a chassis having a left side and a right side, said chassis being completely supported by four drive wheels, said four drive wheels further including, left front and left rear drive wheels disposed to completely support and drive the left side of the vehicle, and right front and right rear drive wheels disposed to completely support and drive the right side of the vehicle; a left side steering actuator disposed to steer the left side wheels and including a first worm gear drive driven by a first steering motor; and a right side steering actuator disposed to steer the right side wheels and including a second worm gear drive driven by a second steering motor.

The left side wheels may be constrained to always rotate at the same ground speed, and the right side wheels may be constrained to always rotate at the same ground speed. The skid steer vehicle may also include a first hydraulic motor coupled to and configured to drive both the left wheels; and a second hydraulic motor coupled to and configured to drive both the right side wheels. The skid steer vehicle may include a first means for coupling the first hydraulic motor to the left side wheels; and a second means for coupling the second hydraulic motor to the right side wheels. Each of the first and second means for coupling may include a forward-extending drive belt and a rear-extending drive belt. The left side steering actuator may be configured to steer the left side wheels in opposite directions, and the right side steering actuator may be configured to steer the right side wheels in opposite directions.

In accordance with a fourth aspect of the invention, a skid steer vehicle is provided, including a chassis, including a first axle housing disposed on the left hand side of the vehicle, said left side housing enclosing a left side drive system, and a second axle housing disposed on the right hand side of the vehicle and enclosing a right had drive system; a pair of left side drive wheels coupled to the left side of the chassis, the left side drive wheels being coupled to and driven by the left side drive system, and the left side drive wheels further being steered by a common left side steering actuator; a pair of right side drive wheels coupled to the right side of the chassis, the right side drive wheels being coupled to and driven by the right side drive system, and the right side drive wheels further being steered by a common right side steering actuator.

The left side drive system may constrain both left side wheels to always rotate at the same speed and in the same direction, and the right side drive system may constrain both right side wheels to always rotate at the same speed and in the same direction. The left and right side drive systems may be independent and may drive the wheels on opposite sides of the vehicle both at different speeds and in different directions. The vehicle may be configured to be steered and driven in three modes of operation including (1) a first mode in which the four wheels are disposed straight ahead and steering is effected by driving the wheels on opposite sides of the vehicle at different rotational speeds in the same direction or different rotational speeds in opposite directions, (2) a second mode in which steering may be effected by turning both front wheels in one direction, turning both rear wheels in the opposite direction, and driving all four wheels in the same rotational direction, and (3) a third mode in which the wheels on the left side and the wheels on the right side are driven in opposite directions, with the front wheels turned in opposite directions and the rear wheels turned in opposite directions. The common left side steering actuator may be fixed to the skid steer chassis between the left front and the left rear wheels, and the common right side steering actuator may be fixed to the chassis between the right front and the right rear wheels. The left side drive system may include a first hydraulic motor coupled to the left front and the left rear drive wheels to simultaneously drive both of them in the same direction and at the same speed, and the right side drive system may include a second hydraulic motor coupled to the right front and the right rear drive wheels to simultaneously drive both of them in the same direction and at the same speed.

In accordance with a fifth aspect of the invention, a steering system for one side of a skid steer vehicle having a chassis is provided, the system including a steering actuator including a housing, a spur gear disposed in the housing, a worm gear disposed in the housing and drivingly coupled to the spur gear, and a motor drivingly coupled to the worm gear; a first steering arm coupled to the steering actuator and extending forward therefrom; and a second steering arm coupled to the steering actuator and extending rearward therefrom; wherein the first and second steering arms have distal ends that are configured to be coupled to and pivot a front drive wheel and a rear drive wheel.

The steering actuator may be configured to be fixed to the chassis of the skid steer vehicle between a front wheel and a rear wheel. The first steering arm may be configured to be coupled to a front wheel to pivot the front wheel with respect to the chassis. The second steering arm may be configured to be coupled to a rear wheel to pivot the rear wheel with respect to the chassis. The first and second steering arms may be coupled to the steering actuator to always steer the front wheel and the rear wheel in opposite directions. The first and second steering arms may be constrained to (1) simultaneously steer the front wheel to the left and the rear wheel to the right; (2) simultaneously steer the front wheel to the right and the rear wheel to the left, and (3) simultaneously steer both front and rear wheels directly ahead.

In accordance with a sixth aspect of the invention, a steering system for a skid steer vehicle is provided, the vehicle having a chassis and having two left side and two right side drive wheels disposed at four corners of the chassis, the system including a left side steering actuator fixed to the chassis between the left front and the left rear wheels; and a right side steering actuator fixed to the chassis between the right front and the right rear wheels.

The left side steering actuator may be coupled to a left front wheel and a right rear wheel to pivot the two left wheels with respect to the chassis. Each steering actuator may include a worm drive. Each steering actuator may include a motor coupled to the worm drive. The steering actuator motors may be controllable to simultaneously steer the left front and right front wheels in one direction and the left rear and right rear wheels in the opposite direction, and the steering actuator motors may be controllable to simultaneously steer the left front and right rear wheels in one direction and the left rear and right front wheels in the opposite direction, and the steering actuator motors may be controllable to simultaneously steer all four wheels straight ahead.

Numerous other features and advantages of the present invention will become readily apparent from the following detailed description, the accompanying drawings, and the appended claims.

DETAILED DESCRIPTION OF THE PREFERRED EMBODIMENTS

While the present invention is susceptible of being made in any of several different forms, the drawings show a particularly preferred form of the invention. One should understand, however, that this is just one of many ways the invention can be made. Nor should any particular feature of the illustrated embodiment be considered a part of the invention, unless that feature is explicitly mentioned in the claims. In the drawings, like reference numerals refer to like parts throughout the several views.

Referring now to the FIGURES, there is illustrated a skid steer vehicle 100 having a chassis 102 that is supported by left front drive wheel 104, right front drive wheel 106, left rear drive wheel 108, an right rear drive wheel 110. Left side drive wheels 104, 108 support the left side of the vehicle entirely and right side drive wheels 106, 110 support the right side of the vehicle entirely.

A pair of loader arms 114,116 is pivotally coupled to the rear 118 of the chassis and extends forward beyond the front 120 of the chassis. A bucket 122 is pivotally coupled to the loader arms to carry a load. A pair of loader lift arm cylinders 124 (one shown) are coupled to and between the loader lift arms and the chassis to raise and lower the loader arms with respect to the chassis. A bucket cylinder 126 is coupled to and between the bucket and the loader lift arms to pivot the bucket with respect to the chassis.

An operator compartment 128 is disposed in a central portion of the chassis and is enclosed by a ROPS cage 130 that extends over the top of the operator's head.

In use, the operator sits in a seat in the operator compartment and manipulates two levers or a pair of joysticks. By manipulating these levers or joysticks he causes the skid steer vehicle to go forward, backward, turn left, turn right, or rotate in place, as well as raise, lower, and tilt the bucket.

Chassis 102 defines a central cavity or compartment 134 in which the operator sits. It is bounded laterally by left and right inner sidewalls 136,138. Left and right side hydraulic drive motors 139,140 are mounted on these sidewalls and have drive shafts 142,144 extending therethrough.

Forwardly extending belts 146,148 are engaged to sprockets 150,152 on drive shafts 142,144 and extend forward to left and right side front axle sprockets 154,156 mounted on left and right side front axles 158,160.

Rearwardly extending belts 162,164 are engaged to sprockets 166,168 on drive shafts 142,144 and extend backward to left and right side rear sprocket 171,173 on rear axles 170,172.

Belts 146,148,162,164 may be of metallic, polymeric or composite construction. They may be fiber reinforced. They may also be constructed of metal rollers.

Wheels 104,106,108,110 are mounted on the free ends of axles 158,160,170,172 to rotate whenever motors 139,140 rotate. This motor, belt and axle arrangement is configured to constrain the wheels on the left side of the vehicle to always rotate at the same ground speed and in the same direction. It is also configured to constrain the wheels on the right side of the vehicle to always rotate at the same ground speed and in the same direction. Although since the two drive motors are independently controllable, the wheels on each side of the vehicle may be driven in different directions (i.e. one driven forward and one driven in reverse) or the same direction, and may be driven at different speeds or the same speed.

Figure 6:
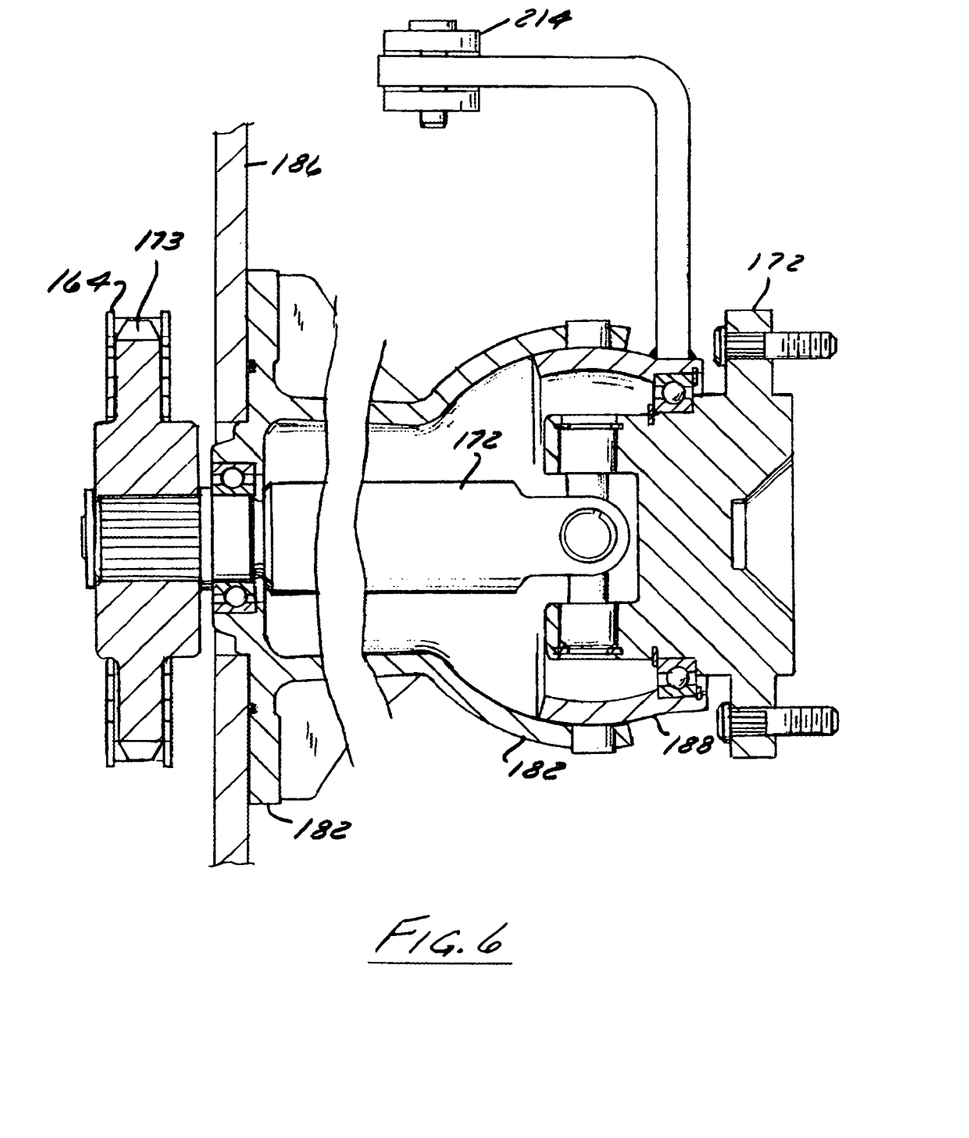
FIG. 6 is a rear cross-sectional view taken through right rear axle housing 180. It is taken generally along section line 6—6 in FIG. 2.

Axles 158,160,170,172 extend through and are supported by axle housings 174,176,178,180. FIG. 6 illustrates in detail the construction of the right rear axle housing 180. The construction of the three other axle housings is identical to the arrangement shown in FIG. 6.

Each axle housing 174,176,178,180 includes a conical inner portion 182 that is fixed to left or right outer sidewalls 184,186 of chassis 102. A swivel housing 188 of each axle housing 174,176,178,180 is pivotally coupled to the inner portion 182 to pivot with respect to the inner portion 182 about a generally vertical axis. It is this pivoting of the swivel housings that steers the vehicle's wheels with respect to the chassis. The swivel housing 188 of each axle housing 174,176,178,180 supports the free end of its respective axle 158,160,170,172, for pivoting about a generally vertical axis with respect to chassis 102. When the swivel housings pivot left and right, they in turn steer their associated wheels left and right respectively.

The swivel housings 188 of axle housings 174,176,178, 180 are steered by two steering systems, a left side steering system 190 and a right side steering system 192.

Figure 5:
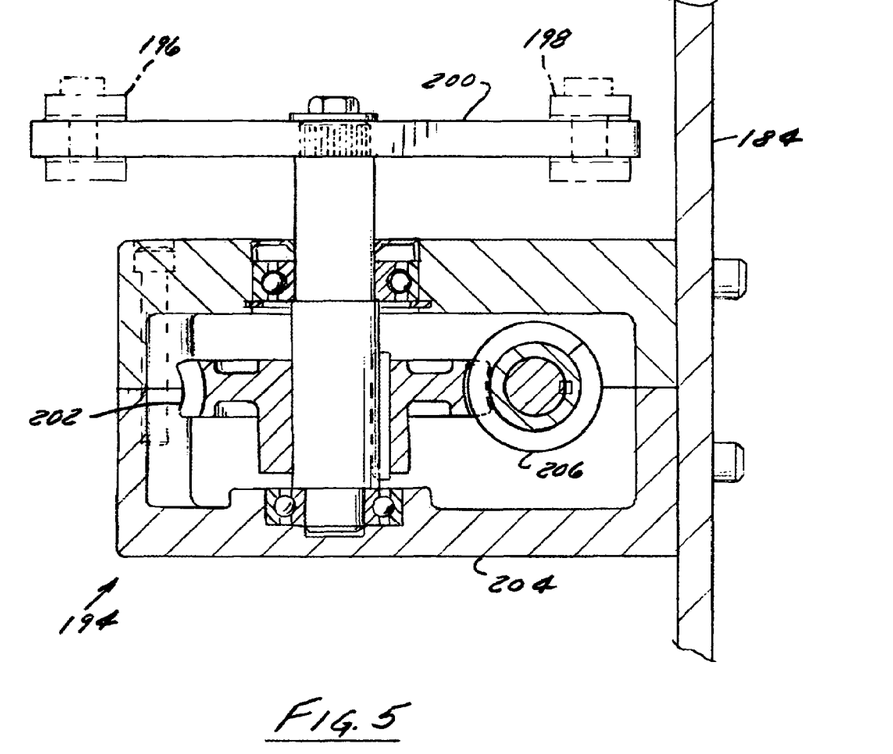
FIG. 5 is a rear cross-sectional view through the left side steering actuator taken generally along section line 5—5 in FIG. 1.

Left side steering system 190 includes a steering actuator 194 that is pivotally coupled to a forwardly extending steering arm or member 196 and a rearwardly extending steering arm or member 198. These steering arms are pivotally coupled to a bell crank 200 of the steering actuator. FIG. 5 illustrates steering actuator 194. Right side steering actuator 210 is identical in construction to actuator 194 but in mirror image form.

Bell crank 200 is coupled to a spur gear 202 that is disposed inside steering actuator housing or casing 204. Spur gear 202 is engaged with worm gear 206, which is also supported inside housing 204. A motor 208 is fixed to the outside of housing 204 and is coupled to worm gear 206 to drive it in rotation.

Whenever motor 208 rotates, it rotates worm gear 206, which in turn rotates bell crank 200. When bell crank 200 rotates clockwise it pushes steering arms 196, 198. This movement causes the left front swivel housing and wheel 104 to rotate anti-clockwise (as viewed from above) and also causes the left rear swivel housing and wheel 108 to rotate clockwise (as viewed from above). When bell crank 200 rotates anti-clockwise it pulls steering arms 196, 198. This movement causes the left front swivel housing and wheel 104 to rotate clockwise (as viewed from above) and also causes the left rear swivel housing and wheel 108 to rotate anti-clockwise (as viewed from above).

Figure 2:
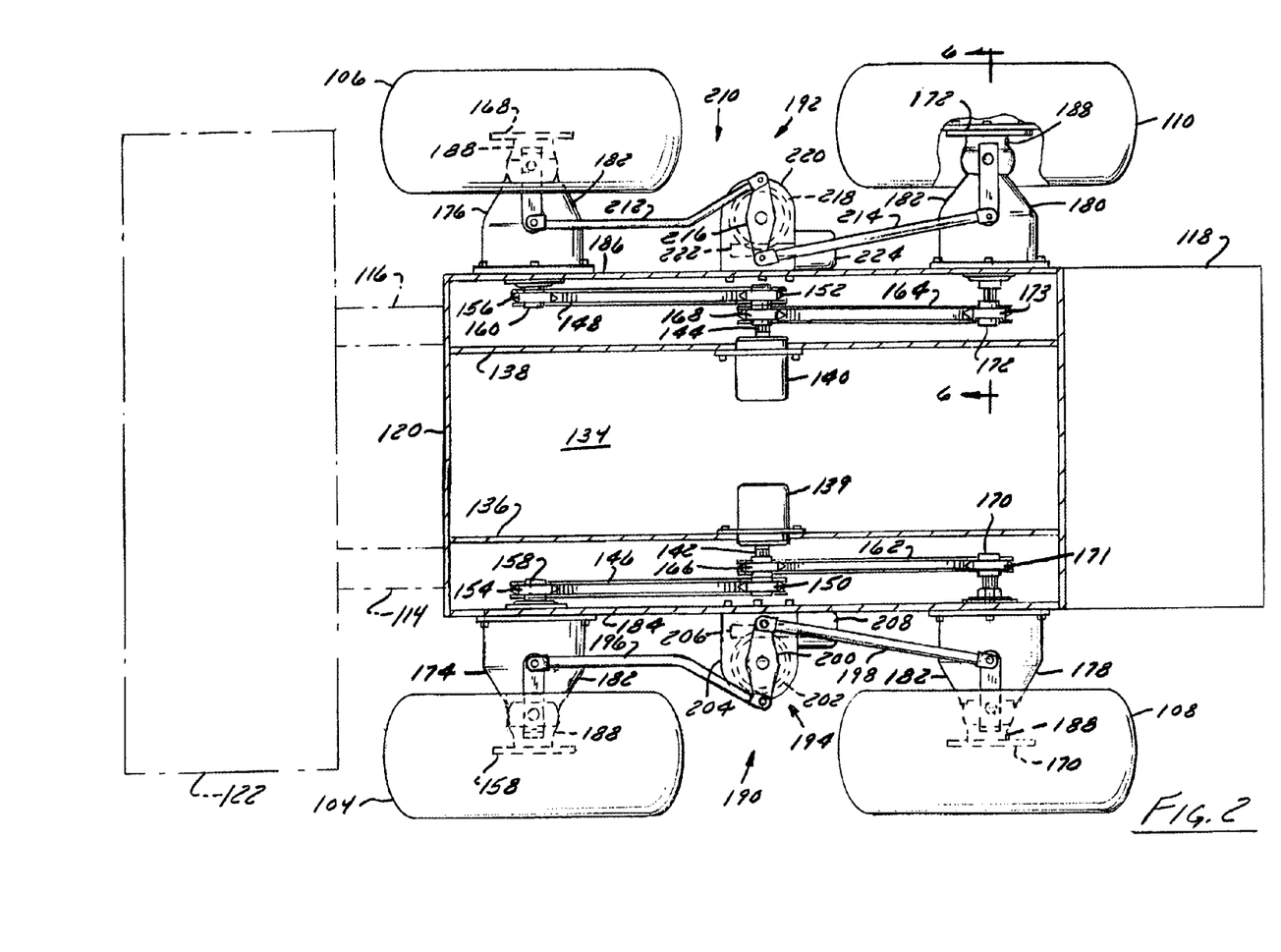
FIG. 2 is a cross-sectional plan view of the skid steer vehicle of FIG. 1 taken generally along section line 2—2, and showing the left and right side steering actuators.

The wheels on the left side of the vehicle are therefore mechanically constrained to always be steered in opposite directions. Whenever the left front wheel turns right, the left rear wheel turns left. Whenever the left front wheel turns left, the left rear wheel turns right. Furthermore, the steering arms and the steering actuator of the left side steering system are configured to point the wheels straight ahead whenever the left side wheels are steered to have parallel rotational axes, as best shown in FIG. 2.

Right side steering system 192 is identically constructed to steering actuator 194, but in mirror arrangement. It includes a steering actuator 210 that is pivotally coupled to a forwardly extending steering arm or member 212 and a rearwardly extending steering arm or member 214. These steering arms are pivotally coupled to a bell crank 216 of the steering actuator.

Bell crank 216 is coupled to a spur gear 218 that is disposed inside steering actuator housing or casing 220. Spur gear 218 is engaged with worm gear 222, which is also supported inside housing 220. A motor 224 is fixed to the outside of housing 220 and is coupled to worm gear 222 to drive it in rotation.

Whenever motor 224 rotates, it rotates worm gear 222, which in turn rotates spur gear 218 and bell crank 216 affixed to the spur gear. When bell crank 216 rotates anti-clockwise it pushes steering arms 212,214. This movement causes the right front swivel housing and wheel 106 to rotate clockwise (as viewed from above) and also causes the right rear swivel housing and wheel 110 to rotate anti-clockwise (as viewed from above). When bell crank 216 rotates clockwise it pulls steering arms 212,214 toward it. This movement causes the right front swivel housing and wheel 106 to rotate anti-clockwise (as viewed from above) and also causes the right rear swivel housing and wheel 110 to rotate clockwise (as viewed from above).

The wheels on the right side of the vehicle are therefore mechanically constrained to always be steered in opposite directions. Whenever the right front wheel turns right, the right rear wheel turns left. Whenever the right front wheel turns left, the right rear wheel turns right. Furthermore, the steering arms and the steering actuator of the right side steering system are selected to point the right side wheels 106,110 straight ahead whenever the right side wheels are steered to have parallel rotational axes, as best shown in FIG. 2.

Furthermore, whenever the left side steering system 190 is steered to place left side wheels 104, 108 into parallel axial relationship and when the right side steering system 192 is steered to place the right side wheels 106,110 into parallel axial relationship, then all four rotational axes of all four wheels are horizontal, parallel to each other and perpendicular to the longitudinal axis of vehicle 100.

Steering motors 208 and 224 are preferably electric or hydraulic motors. If electric motors they are preferably stepping motors configured to be stepped to any of a variety of rotational positions and stopped. They may have built-in position sensors that sense their absolute rotational position. Alternatively, they may have relative rotation sensors built in that indicate the relative motion of the motor when they rotate between several different positions.

Motors 208 and 224 can be independently driven to steer the wheels on each side of the vehicle to different steering positions. There are several preferred combinations of left side and right side steering positions to which motors 208,224 can steer their respective left and right side wheels.

Figure 1:
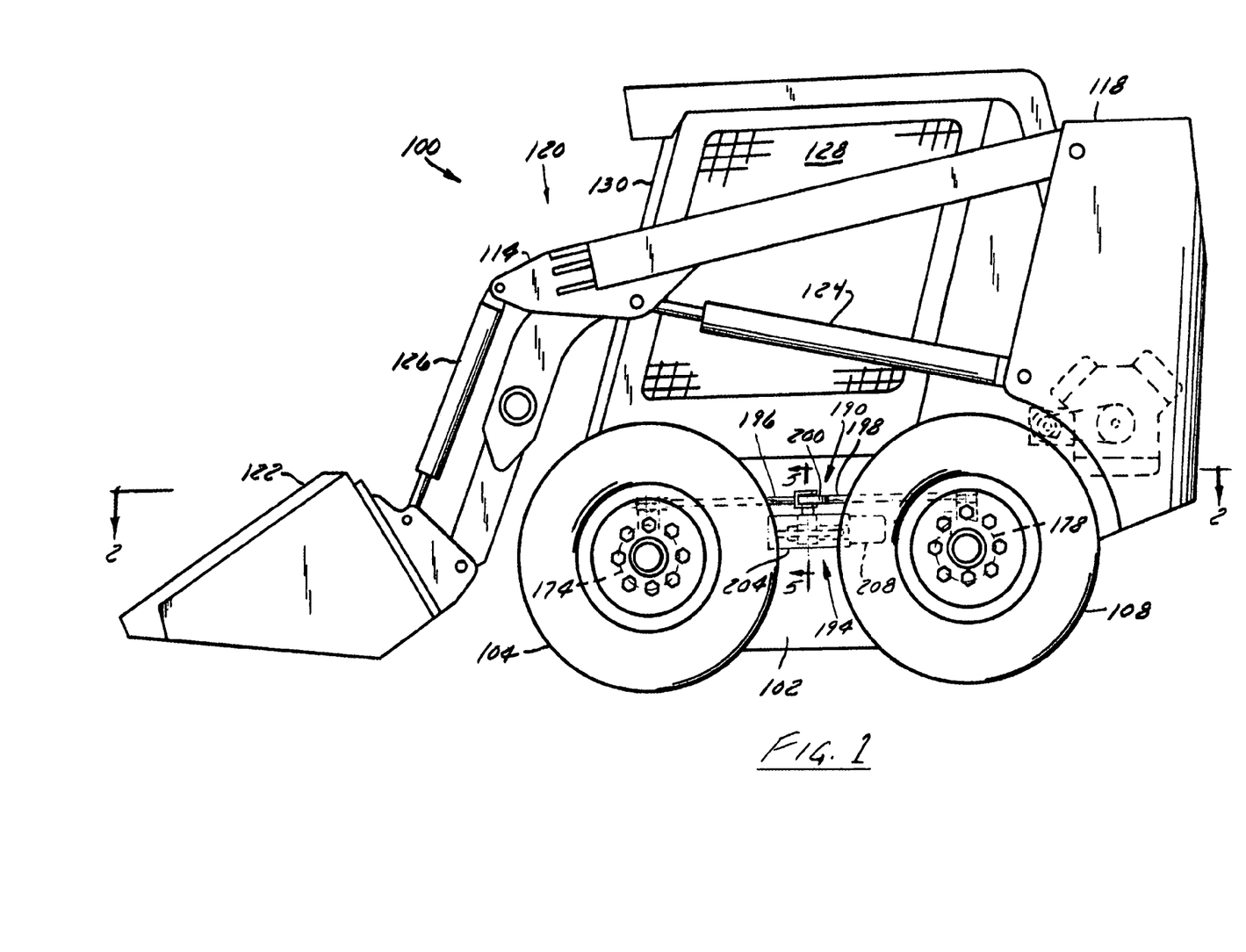
FIG. 1 is a left side view of a skid steer vehicle in accordance with the present invention

First, motors 208,224 are configured to steer all four wheels to a position in which the rotational axes of all four wheels are horizontal, parallel to each other and the wheels point straight ahead. This is called the straight ahead position and is best shown in FIGS. 1 and 2.

Figure 3:
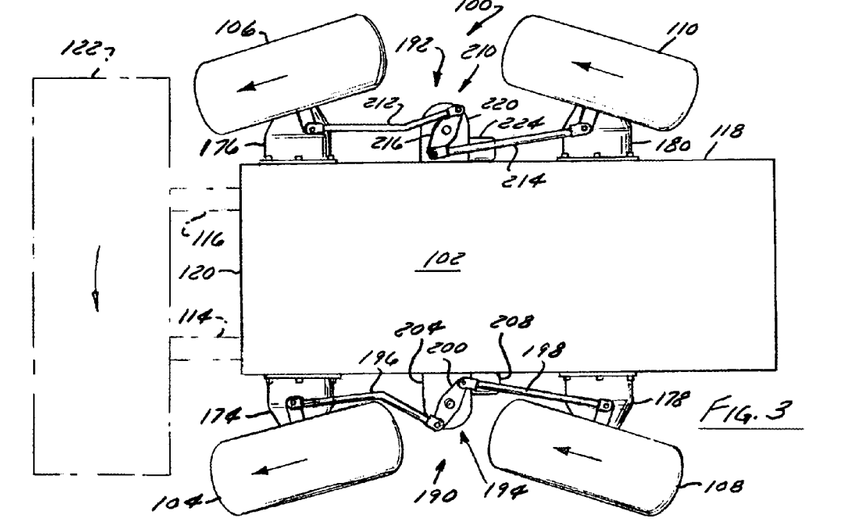
FIG. 3 is a plan view of the skid steer of FIGS. 1–2, in which the wheels are turned to steer to the left with limited skidding.

Second, motors 208,224 are configured to steer all four wheels to a position in which (1) the rotational axes of the left and right front wheels are generally parallel, with the front wheels pointing to the left at a first angle, and (2) the rotation axes of the left and right rear wheels are generally parallel with the rear wheels pointing to the right at a second angle generally equal to the first angle, This is called a left turn steer position and is best shown in FIG. 3.

Third, motors 208,224 are configured to steer all four wheels to a position in which (1) the rotational axes of the left and right front wheels are generally parallel, with the front wheels pointing to the right at a third angle, and (2) the rotation axes of the left and right rear wheels are generally parallel with the rear wheels pointing to the left at a fourth angle generally equal to the third angle, This is called a right turn steer position and is a mirror image of the configuration shown in FIG. 3. It has not been separately illustrated herein.

Figure 4:
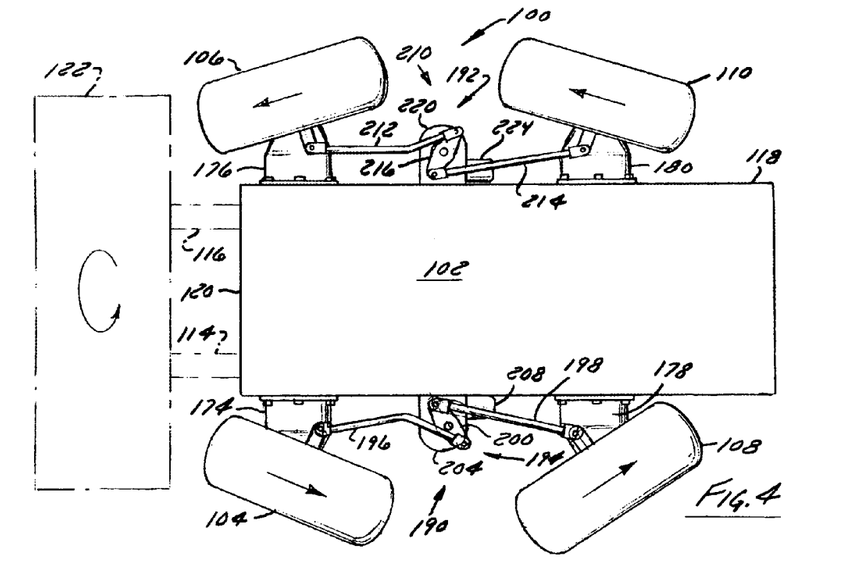
FIG. 4 is a plan view of the skid steer of FIGS. 1–4 in which the wheels are turned to a pivot steer position.

Fourth, motors 208,224 are configured to steer all four wheels to a position in which (1) the left front and the right front wheels are turned inward, with the left front wheel turned right and the right front wheel turned left, and (2) the left and right rear wheels are turned outward, with the left rear wheel turned left and the right rear wheel turned right. This is called a pivot steer position and is shown in FIG. 4.

In a particularly preferred pivot steer position, the left front wheel and the right rear wheel preferably have parallel axes of rotation and point to the right at a fifth angle with respect to the longitudinal axis of the vehicle 100, and the right front wheel and the left rear wheels have parallel axes of rotation and are pointed to the left at a sixth angle that is generally equal to the fifth angle. This position is shown in FIG. 4.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

I claim:

1. A skid steer vehicle comprising:
   a chassis having a left side and a right side;
   left front and left rear drive wheels coupled to the left side of the chassis in fore-and-aft relation and driven by at least a first hydraulic motor;
   a left side steering actuator coupled to the left front and rear wheels to simultaneously steer the left front wheel to the right and the left rear wheel to the left in a first mode of left wheel operation, and to simultaneously steer the left front wheel to the left and the left rear wheel to the right in a second mode of left wheel operation;
   right front and right rear drive wheels coupled to the right side of the chassis in fore-and-aft relation and driven by at least a second hydraulic motor different from the first hydraulic motor; and
   a right side steering actuator coupled to the right front and rear wheels to simultaneously steer the right front wheel to the right and the right rear wheel to the left in a first mode of right wheel operation, and to simultaneously steer the right front wheel to the left and the right rear wheel to the right in a second mode of right wheel operation.

2. The skid steer vehicle of claim 1,
   wherein the at least a first motor is coupled to the left front and left rear drive wheels to drive both left wheels forward at a common ground speed and backward at a common ground speed; and
   wherein the at least a second motor is coupled to the right front and right rear drive wheels to drive both right wheels forward at a common ground speed and backward at a common ground speed.

3. The skid steer vehicle of claim 1, wherein the left side steering actuator is controllable to steer the left front wheel to the right, and wherein the right side steering actuator is controllable to simultaneously steer the right front wheel to the left.

4. The skid steer vehicle of claim 1, wherein the four wheels are the same size, and further wherein the four wheels can be simultaneously driven clockwise while the left front wheel is steered right and the right front wheel is steered left.

5. The skid steer vehicle of claim 4, wherein the left side wheels can be driven anti-clockwise and the right side wheels simultaneously driven clockwise while the left front and right front wheels are steered in generally the same direction.

6. The skid steer vehicle of claim 1, wherein the left side steering actuator is fixed to the left side of the chassis between the left front and left rear wheels, and the right side steering actuator is fixed to the right side of the chassis between the right front and right rear wheels.

7. The skid steer vehicle of claim 6, wherein each of the steering actuators includes a housing enclosing a worm gear drive, and a motor coupled to the worm gear drive.

8. A skid steer vehicle, comprising:
   a chassis having a left side and a right side;
   left front and left rear drive wheels coupled to the left side of the chassis;
   a left side steering actuator disposed to simultaneously steer the left front wheel to the right and the left rear wheel to the left in a first mode of left wheel operation, and to simultaneously steer the left front wheel to the left and the left rear wheel to the right in a second mode of left wheel operation;
   right front and right rear drive wheels coupled to the right side of the chassis; and
   a right side steering actuator disposed to simultaneously steer the right front wheel to the right and the right rear wheel to the left in a first mode of right wheel operation, and to simultaneously steer the right front wheel to the left and the right rear wheel to the right in a second mode of right wheel operation.

9. The skid steer vehicle of claim 8, wherein the left side actuator is configured to steer the front left wheel to the right and wherein the right side steering actuator is configured to steer the right front wheel simultaneously to the left.

10. The skid steer vehicle of claim 9, further comprising:
    left side and right side forward extension links coupling the left and right front wheels to the left and right steering actuators, respectively; and
    left side and right side rear extension links coupling the left and right rear wheels to the left and right steering actuators, respectively.

11. The skid steer vehicle of claim 8, wherein the left side wheels are mechanically constrained to always steer in opposite directions, and wherein the right side wheels are mechanically constrained to always steer in opposite directions.

12. The skid steer vehicle of claim 11, wherein both the left and right front wheels steer in a same first direction whenever both the left and right rear wheels turn in a same opposing direction.

13. The skid steer vehicle of claim 8, wherein the left and right front wheels steer in opposite directions whenever the left and right rear wheels are steered in opposite directions.

14. A skid steer vehicle comprising:
    a chassis having a left side and a right side, said chassis being completely supported by four drive wheels, said four drive wheels further including,
    left front and left rear drive wheels disposed to completely support and drive the left side of the vehicle, and
    right front and right rear drive wheels disposed to completely support and drive the right side of the vehicle;
    a left side steering actuator disposed to steer the left side wheels and including a first worm gear drive driven by a first steering motor; and
    a right side steering actuator disposed to steer the right side wheels and including a second worm gear drive driven by a second steering motor.

15. The skid steer vehicle of claim 14 wherein the left side wheels are constrained to always rotate at the same ground speed, and wherein the right side wheels are constrained to always rotate at the same ground speed.

16. The skid steer vehicle of claim 15, further comprising:
    a first hydraulic motor coupled to and configured to drive both the left side wheels; and a second hydraulic motor coupled to and configured to drive both the right side wheels.

17. The skid steer vehicle of claim 16, further comprising:
a first means for coupling the first hydraulic motor to the left side wheels; and
a second means for coupling the second hydraulic motor to the right side wheels.

18. The skid steer vehicle of claim 17, wherein each of the first and second means for coupling include a forward-extending drive belt and a rear-extending drive belt.

19. The skid steer vehicle of claim 18, wherein the left side steering actuator is configured to steer the left side wheels in opposite directions, and further wherein the right side steering actuator is configured to steer the right side wheels in opposite directions.

20. A skid steer vehicle comprising:
a chassis having a left hand and a right hand side:
two axle housings fixed to the left hand side of the chassis, said two left side housings enclosing two left axles,
two axle housings fixed to the right hand side of the chassis, said two right side housings enclosing two right axles;
a common left side steering actuator:
a pair of left side drive wheels coupled to the two left axle housings, the left side drive wheels being steerable by a common left side steering actuator;
a common right side steering actuator operable independently of the left side steering actuator; and
a pair of right side drive wheels coupled to the two right axle housings, the right side drive wheels being steerable by a common right side steering actuator.

21. The skid steer vehicle of claim 20, further comprising:
a left side drive system coupled to the two left axles to constrain both of the left side wheels to always rotate at the same speed and in the same direction; and
a right side drive system coupled to the two right axles to constrain both of the right side wheels to always rotate at the same speed and in the same direction.

22. The skid steer vehicle of claim 21, wherein the left and right side drive systems are configured to respectively drive the left and right wheels at different speeds and in different rotational directions.

23. The skid steer vehicle of claim 20, wherein the vehicle is configured to be steered and driven in three modes of operation including (1) a first mode in which the four wheels are disposed straight ahead and steering is effected by driving the wheels on opposite sides of the vehicle (a) at different rotational speeds in both (a) the same rotational direction and (b) opposite rotational directions, (2) a second mode in which steering is effected by (a) turning both front wheels in one direction, (b) turning both rear wheels in the opposite direction, and (c) driving all four wheels in the same rotational direction, and (3) a third mode in which the wheels on the left side and the wheels on the right side are rotated in opposite directions, with the front wheels steered in opposing directions and the rear wheels steered in opposing directions.

24. The skid steer vehicle of claim 23, wherein the common left side steering actuator is fixed to the skid steer chassis between the left front and the left rear wheels, and further wherein the common right side steering actuator is fixed to the chassis between the right front and the right rear wheels.

25. The skid steer vehicle of claim 24, wherein the left side drive system includes a first hydraulic motor coupled to the left front and the left rear drive wheels to simultaneously drive them both in the same direction and at the same speed, and further wherein the right side drive system includes a second hydraulic motor coupled to the right front and the right rear drive wheels to simultaneously drive them both in the same direction and at the same speed.

26. A steering system for one side of a skid steer vehicle, the vehicle having a chassis, the system comprising:
a steering actuator including a housing, a spur gear disposed in the housing, a worm gear disposed in the housing and drivingly coupled to the spur gear, and a motor drivingly coupled to the worm gear;
a first steering arm coupled to the steering actuator and extending forward therefrom; and
a second steering arm coupled to the steering actuator and extending rearward therefrom;
wherein the first and second steering arms have distal ends that are configured to be coupled to, respectively, a front drive wheel and a rear drive wheel, and further wherein the front and rear drive wheels are coupled together to skid steer the vehicle.

27. The steering system of claim 26, wherein the steering actuator is configured to be fixed to the chassis between the front wheel and the rear wheel.

28. The steering system of claim 27, wherein the first steering arm is configured to be coupled to a front wheel to steer the front wheel with respect to the chassis.

29. The steering system of claim 28, wherein the second steering arm is configured to be coupled to a rear wheel to steer the rear wheel with respect to the chassis.

30. The steering system of claim 29, wherein the first and second steering arms are coupled to the steering actuator to always steer the front wheel and the rear wheel in opposite directions with respect to the chassis.

31. The steering system of claim 30, wherein the first and second steering arms are constrained (1) to simultaneously steer the front wheel to the left and the rear wheel to the right; (2) to simultaneously steer the front wheel to the right and the rear wheel to the left, and (3) to simultaneously steer both wheels directly ahead.

32. A steering system for a skid steer vehicle, the vehicle having a chassis and having two left side drive wheels, and two right side drive wheels drivable independently from the left side drive wheels to skid steer the vehicle, said four drive wheels being disposed at four corners of the chassis, the system comprising:
a left side steering actuator fixed to the chassis between the left front and the left rear wheels, and
a right side steering actuator fixed to the chassis between the right front and the right rear wheels wherein the left side steering actuator is coupled to a left front wheel and to a left rear wheel to pivot the two left wheels with respect to the chassis.

33. The steering system of claim 32, wherein each steering actuator includes a worm drive.

34. The steering system of claim 33, wherein each steering actuator includes a motor coupled to the worm drive.

35. The steering system of claim 34, wherein the steering actuator motors are controllable (1) to steer the left front and right front wheels in one direction and the left rear and right rear wheels in the opposite direction simultaneously, and (2) to steer the left front and right rear wheels in one direction and the left rear and right front wheels in the opposite direction simultaneously, and (3) to simultaneously steer all four wheels straight ahead.

* * * * *